United States Patent [19]

Masumoto et al.

[11] Patent Number: 4,939,231
[45] Date of Patent: Jul. 3, 1990

[54] PROCESS FOR PRODUCING FATTY ACID-TERMINATED POLYCARBONATE RESIN

[75] Inventors: Mituhiko Masumoto; Toshiaki Takata; Satoshi Kanayama, all of Osaka, Japan

[73] Assignee: Mitsubishi Gas Chemical Company, Inc., Tokyo, Japan

[21] Appl. No.: 246,574

[22] Filed: Sep. 12, 1988

[30] Foreign Application Priority Data

Sep. 11, 1987 [JP] Japan .................. 62-226490

[51] Int. Cl.$^5$ ............................... C08G 64/24
[52] U.S. Cl. ................. 528/198; 528/196; 528/199
[58] Field of Search ................ 528/199, 198

[56] References Cited

U.S. PATENT DOCUMENTS

| | | | |
|---|---|---|---|
| 3,173,891 | 3/1965 | Fry et al. | 528/199 |
| 3,184,431 | 5/1965 | Deanin et al. | 528/199 |
| 3,275,601 | 9/1966 | Schnell et al. | 528/199 |

FOREIGN PATENT DOCUMENTS

2711184 9/1978 Fed. Rep. of Germany ...... 528/199

*Primary Examiner*—Harold D. Anderson
*Attorney, Agent, or Firm*—Sughrue, Mion, Zinn, Macpeak & Seas

[57] ABSTRACT

A process for producing a polycarbonate resin having excellent heat stability from a dihydric phenol compound represented by the formula (1) shown below by an interfacial polymerization method wherein fatty acid represented by the formula (2), (3), (4) or (5) shown below is used as a terminator and as a polymerization catalyst, a quaternary ammonium salt is used, and after 5 to 40 minutes from the addition and emulsification of the polymerization catalyst, tertiary amine is added to cause polymerization.

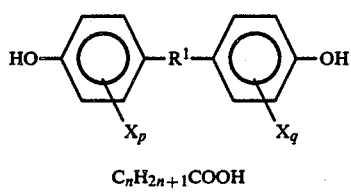

Formula (1):

$C_nH_{2n+1}COOH$  Formula (2):

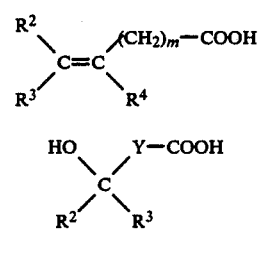

Formula (3):

Formula (4):

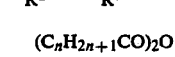

$(C_nH_{2n+1}CO)_2O$  Formula (5):

wherein all the symbols are the same as defined before.

8 Claims, No Drawings

PROCESS FOR PRODUCING FATTY ACID-TERMINATED POLYCARBONATE RESIN

FIELD OF THE INVENTION

The present invention relates to a novel process for producing a polycarbonate resin using fatty acid as a terminator. In accordance with the process of the present invention, in addition to fatty acids such as acetic acid and stearic acid, compounds containing an alcoholic hydroxy group and an unsaturated double bond, such as glycolic acid and acrylic acid, can be easily incorporated at the terminal of the polycarbonate resin.

BACKGROUND OF THE INVENTION

In the conventional process for producing an aromatic polycarbonate resin by interfacial polymerization method, monohydric phenols such as p-tert-butylphenol and phenol are usually used as terminators or molecular weight modifiers. In addition, use of fatty acid chloride and so on is known.

In the conventional process, fatty acid has not been used as such as a terminator because the fatty acid does not have sufficiently high reactivity and cannot control the molecular weight, leading to the production of high molecular weight products.

Therefore, in producing aromatic polycarbonate having fatty acid at the terminal thereof by the interfacial polymerization method, fatty acid chloride is used in place of fatty acid. Even in the conventional process using fatty acid chloride, since the fatty acid chloride contains unreacted fatty acid and further fatty acid resulting from decomposition thereof during polymerization as impurities, and the reactivity is poor as compared with the case in which monohydric phenols such as p-ter-butylphenol are used as terminators, polycarbonate not having the terminator at the terminal thereof is formed. Thus, it has been difficult to produce polycarbonate having sufficiently high heat stability.

As a result of investigations to develop a method for introducing fatty acid in the terminal of polycarbonate, it has been found that in producing an aromatic polycarbonate resin by the interfacial polymerization method, if tertiary amine is added after addition of a quaternary ammonium salt as a polymerization catalyst, the fatty acid can be introduced in the terminal of polycarbonate.

SUMMARY OF THE INVENTION

The present invention relates to a process for producing a polycarbonate resin from a dihydric phenol compound represented by the formula (1) as shown below by the interfacial polymerization method, which process is characterized in that a fatty acid represented by the formula (2), (3), (4) or (5) as shown below is used as a molecular weight modifier, a quaternary ammonium salt is added as a polymerization catalyst and stirred to emulsify, and after 5 to 40 minutes a tertiary amine is added to cause polymerization, thereby obtaining a fatty acid-terminated polycarbonate resin having excellent heat stability.

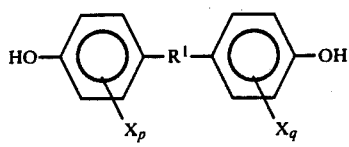

Formula (1):

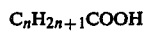  Formula (2):

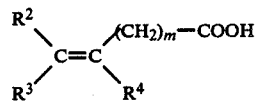  Formula (3):

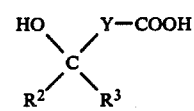  Formula (4):

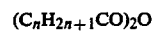  Formula (5):

wherein $R^1$ is a straight, branched or cyclic alkylidene group having 1 to 10 carbon atoms, an aryl-substituted alkylene group, an aryl group, —O—, —CO—, —S—, or —SO2—; X is halogen or a lower alkyl group; p and q are each an integer of 0 to 2; $R^2$, $R_3$ and $R_4$ are each hydrogen or a lower (e.g. $C_{1-4}$) alkyl group; Y is merely a bond or an alkylene group having 1 to 10 carbon atoms; m is an integer of 0 to 10; and n is an integer of 1 to 30.

DETAILED DESCRIPTION OF THE INVENTION

The fatty acid-terminated polycarbonate of the present invention is produced in the same manner as in the conventional interfacial polymerization method except that after a dihydric phenol compound and phosgene are reacted in an inert organic solvent in the presence of an aqueous alkali solution, the compound of the formulae (2) to (5) as a terminator and a quaternary ammonium salt as a polymerization catalyst are added, the resulting reaction mixture is vigorously stirred and emulsified and, after 5 to 40 minutes, preferably 10 to 30 minutes, a tertiary amine is added to conduct polymerization while stirring In this case, the terminator may be previously added at the time of the phosgenation reaction.

If the quaternary ammonium salt as a polymerization catalyst is added at the time of the phosgenation reaction, the polymerization reaction is undesirably accelerated, leading to decomposition of phosgene and so on.

If the quaternary ammonium salt and the tertiary amine are added at the same time, or the tertiary amine is added within five minutes after addition of the quaternary ammonium salt, the reactivity of fatty acid is markedly reduced and a high molecular weight polycarbonate is only obtained. If only the quaternary ammonium salt is used, the rate of polymerization is decreased and a large amount of polycarbonates having a chloroformate group and a phenolic OH group at the terminal thereof undesirably remain. If only the tertiary amine is used, fatty acid does not effectively act as a terminator and, therefore, it is impossible to control the molecular weight and only high molecular weight polycarbonate is obtained.

Preferred examples of the dihydric phenol compound of the formula (1) to be used in the above reaction of the present invention are bis(4-hydroxyphenyl)methane, bis(4-hydroxyphenyl) ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane, 2,2-bis(4-hydroxyphenyl)-butane, 1,1-bis(4-hydroxyphenyl)cyclohexane, 2,2-bis(4-hydroxy-3,5- dibromophenyl)propane, 2,2-bis(4-hydroxy-3,5-dichlorophenyl)propane, 2,2-bis(4-hydroxy-3-bromophenyl)-propane, 2,2-bis(4-hydroxy-3-chlorophenyl)propane, 2,2bis(4-hydroxy-3,5-dimethylphenyl)propane, 1,1-bis(4-hydroxyphenyl)-1-phenylethane, and bis(4-hydroxyphenyl)-diphenylmethane.

The fatty acid to be used as the terminator or molecular weight modifier in the present invention includes acetic acid, propionic acid, capric acid, capronic acid, lauryl acid, myristic acid, palmitic acid, stearic acid, cerotic acid and the like as represented by the formula (2); acrylic acid, methacrylic acid, vinyl acetate, 2-pentenic acid, 3-pentenic acid, 5-hexenic acid, 9-decenic acid, 9-undecenic acid and the like as represented by the formula (3); glycolic acid, pivalic acid, lactic acid, α-oxy-n-butyric acid, α-oxyisobutyric acid, α-oxy-n-valeric acid, α-oxy-n-caproic acid, 2-oxy-2,4-dimethylpentanic acid and the like as represented by the formula (4); and acetic anhyride, propionic anhyride, capric anhyride, caproic anhyride, lauric anhyride, stearic anhyride and the like as represented by the formula (5). The amount of the fatty acid used is 100 to 0.5 mol, preferably 30 to 2 mol, per 100 mol of the dihydric phenol compound. These fatty acids can be used in combination with the conventional terminators.

Examples of the quaternary ammonium salt to be used as a polymerization catalyst in the present invention are trimethylbenzylammonium chloride, tetramethylammonium chloride, triethylbenzylammonium chloride and the like. The amount of the quaternary ammonium salt added is 0.01 to 10 parts by weight, preferably 0.1 to 3 parts by weight, per 100 parts by weight of the dihydric phenol compound. If the amount of the quaternary ammonium salt added is less than 0.01 part by weight, the reactivity of fatty acid is poor. On the other hand, if it is more than 10 parts by weight, an organic layer containing polycarbonate and an aqueous layer become difficult to separate from each other at the time of purification.

Examples of the tertiary amine are trimethylamine, triethylamine, tributylamine, tripropylamine, trihexylamine, tridecylamine, N,N-dimethylcyclohexylamine, pyridine, quinoline, dimethylaniline and the like. The amount of the tertiary amine added is 0.01 to 1.0 part by weight, preferably 0.05 to 0.2 part by weight, per 100 parts by weight of the dihyric phenol compound. If the amount of the tertiary amine added is less than 0.01 part by weight, a large amount of polycarbonate having a chloroformate group or a phenolic OH group at the terminal thereof remains On the other hand, if it is more than 1.0 part by weight, the tertiary amine readily remains in polycarbonate, reducing the heat stability of the polycarbonate.

Examples of the inert solvent are chlorinated hydrocarbons such as dichloromethane, 1,2-dichloroethane, 1,1,2,2tetrachloroethane, chloroform, 1,1,1-trichloroethane, carbon tetrachloride, monochlorobenzene, dichlorobenzene and the like; aromatic hydrocarbons such as benzene, toluene, xylene, ethylbenzene and the like; and ether compounds such as diethyl ether and the like. These organic solvents can be used as mixtures comprising two or more thereof. If necessary, solvents having affinity for water, such as ethers other than the above compounds, ketones, esters, nitriles and the like, can be used within the range that the resulting mixed solvent is not completely compatible with water.

The polycarbonate resin of the present invention is produced using the above compounds as essential components. A branching agent can be used in an amount of 0.01 to 3 mol, especially 0.1 to 1.0 mol, per 100 mol of the dihydric phenol compound to produce branched polycarbonate. Examples of the branching agent are polyhydroxy compounds such as phloroglucin, 2,6-dimethyl-2,4,6-tri(4-hydroxyphenyl)-heptene-3, 4,6-dimethyl-2,4,6-tri(4-hydroxyphenyl)heptene-2, 1,3,5-tri(2-hydroxyphenyl)benzole, 1,1,1-tri(4-hydroxyphenyl)-ethane, 2,6-bis(2-hydroxy-5-methylbenzyl)-4-methylphenol, α,α',α"-tri(4-hydroxyphenyl)-1,3,5-triisopropylbenzene and the like, 3,3-bis(4-hydroxyaryl)oxyindole (=isatin bisphenol), 5-chloroisatin, 5,7-dichloroisatin, 5-bromoisatin, and the like.

The fatty acid-terminated polycarbonate resin of the present invention as produced by the above process does not substantially contain unreacted fatty acid and an unreacted terminal and, therefore, is superior in heat stability to those produced by the method using fatty acid chloride. Furthermore, since fatty acid is used as such, the process of the present invention is advantageous from an economic standpoint. Moreover, a functional group such as an alcoholic hydroxy group, an acrylate group and the like can be easily incorporated in the terminal of polycarbonate. Polycarbonate containing such a functional group is suitable, for use as a starting material for copolymerization, or for use in preparation of compositions containing resins which are not easily compatible with the conventional polycarbonate and cannot provide a useful composition, by melt mixing with other polymers easily reacting with the functional group. The polycarbonate of the present invention is used alone or in combination with the usual polycarbonate resin.

To the fatty acid-terminated polycarbonate resin of the present invention or its composition can be added, if necessary, an antioxidant, a light stabilizer, a colorant, an inorganic or organic filler, a reinforcing agent such as carbon fiber, glass fiber and the like, a lubricant, an antistatic agent and so on.

In accordance with the process of the present invention, fatty acid-terminated polycarbonate not substantially containing unreacted fatty acid and an unreacted terminal can be obtained without use of fatty acid chloride. The process of the present invention can be easily industrialized because the conventional interfacial polymerization method can be employed as such except that the type of the catalyst and the method of addition are specified.

In the present invention, glycolic acid, acrylic acid and the like which contain a hydroxy group or unsaturated double bond as well as aliphatic carboxylic acid can be used as a terminator. Utilizing these terminal groups, the polycarbonate resin of the present invention can be used as a material to be blended with other resins, or as a starting material for a block-copolymer utilizing the hydroxy group or unsaturated double bond.

The present invention is described in greater detail by reference to the following examples.

EXAMPLE 1

4.0 kg of sodium hydroxide was dissolved in 42 l of water, and while maintaining the resulting solution at 20° C., 7.3 kg of 2,2-bis(4-hydroxyphenyl)propane and 8 g of hydrosulfite were dissolved therein.

28 l of methylene chloride was further added, and 4.4 kg of phosgene was then blown therein over 60 minutes while stirring.

After introduction of phosgene was completed, 460 g of acrylic acid and 73 g of tetrabutylammonium bromide were added, and the resulting mixture was emulsified by vigorously stirring. After 20 minute emulsification, 8 g of triethylamine was added, and the resulting mixture was polymerized for about one hour while stirring.

The reaction mixture was separated into an aqueous layer and an organic layer. This organic layer was neutralized with phosphoric acid and then repeatedly washed with water until the pH of the washing solution became neutral. 35 ( of isoproponol was added to precipitate a polymer product. The precipitate was filtered off and then dried to obtain a white powdery polycarbonate oligomer. The analytical results of the polycarbonate oligomer are shown in Table 1.

EXAMPLE 2

A polycarbonate oligomer was produced in the same manner as in Example 1 except that 547 g of acetic acid was used in place of acrylic acid and the amount of tetrabutylammonium bromide used was changed to 146 g. The analytical results of the polycarbonate oligomer are shown in Table 1.

EXAMPLE 3

A polycarbonate resin was produced in the same manner as in Example 1 except that the amount of phosgene used was changed to 3.8 kg, 155 g of glycolic acid was used in place of acrylic acid, and 14.6 g of triethylbenzylammonium chloride was used in place of tetrabutylammonium bromide. The analytical results of the polycarbonate thus obtained are shown in Table 1.

EXAMPLE 4

A polycarbonate resin was produced in the same manner as in Example 1 except that the amount of phosgene used was changed to 3.8 kg, 455 g of stearic acid was used in place of acrylic acid, and the amount of tetrabutylammonium bromide used was changed to 14.6 g. The analytical results of the polycarbonate thus obtained are shown in Table 1.

EXAMPLE 5

A polycarbonate resin was produced in the same manner as in Example 1 except that the amount of phosgene used was changed to 3.8 kg, 62 g of acetic anhydride was used in place of acrylic acid, and 22 g of trimethylbenzylammonium chloride was used in place of tetrabutylammonium chloride. The analytical results of the polycarbonate thus obtained are shown in Table 1.

COMPARATIVE EXAMPLE 1

On repeating the procedure of Example 1 except that tetrabutylammonium bromide was not used, and after completion of introduction of phosgene, 8 g of triethylamine was added and reacted, high molecular weight polycarbonate was obtained. The analytical results of the polycarbonate are shown in Table 1.

COMPARATIVE EXAMPLE 2

The procedure of Example 3 was repeated except that triethylamine was not added. The analytical results of the polycarbonate are shown in Table 1.

COMPARATIVE EXAMPLE 3

On repeating the procedure of Example 3 except that after completion of introduction of phosgene, 14.6 g of triethylbenzylammonium chloride and 8 g of triethylamine were added at the same time and reacted, high molecular weight polycarbonate was obtained. The analytical results of the polycarbonate are shown in Table 1.

The symbols used in Table 1 have the following meanings.

Terminator

AA: Acrylic acid
SA: Stearic acid
AC: Acetic acid
AAc: Acetic anhyride
GA: Glycolic acid Polymerization Catalyst TBAB: Tetrabutylammonium bromide
TEBAC: Triethylbenzylammonium chloride
TMBAC: Trimethylbenzylammonium chloride
TEA: Triethylamine
Mc: Average viscosity m
n: Average degree of polymerization
Terminal Cl: Chlorine content of the terminal group

TABLE 1

| | Example | | | | | Comparative Example | | |
|---|---|---|---|---|---|---|---|---|
| | 1 | 2 | 3 | 4 | 5 | 1 | 2 | 3 |
| Terminator: | | | | | | | | |
| Type | AA | Ac | GA | SA | AAc | AA | GA | GA |
| Amount (mol %) | 20 | 28.5 | 6.4 | 5.0 | 1.9 | 20 | 6.4 | 6.4 |
| Polymerization catalyst: | | | | | | | | |
| Type | TBAB | TBAB | TEBAC | TBAB | TMBAC | — | TEBAC | TEBAC |
| Amount (parts) | 1.0 | 2.0 | 0.2 | 0.2 | 0.3 | — | 0.2 | 0.2 |
| Amount of TEA (parts) | 0.1 | 0.1 | 0.1 | 0.1 | 0.1 | 0.1 | — | 0.1 |
| Mv or (n) | n 10 | n 7 | 16,000 | 19,000 | 22,000 | 150,000 | 11,000 | 110,000 |
| Terminal Cl | trace | trace | trace | trace | trace | trace | 0.1% | trace |

While the invention has been described in detail and with reference to specific embodiments thereof, it will be apparent to one skilled in the art that various changes and modification can be made therein without departing from the spirit and scope thereof.

What is claimed is:

1. In a process for producing a polycarbonate resin having excellent heat stability by an interfacial polymerization method which comprises reacting a dihydric phenol compound represented by formula (1) or a mixture of the dihydric phenol compound and a terminator, and phosgene, in an inert organic solvent and an aqueous alkali solution to conduct phosgenation, and adding a polymerization catalyst and a terminator, when the terminator is not added during the phosgenation reaction, to the phosgenation reaction solution to effect emulsion polymerization, the improvement wherein (a) the terminator is a compound represented by formulae (2), (3), (4) or (5),
(b) a quaternary ammonium salt is the polymerization catalyst, wherein the emulsion polymerization is conducted for 5 to 40 minutes, and
(c) wherein a tertiary amine is added to cause the emulsion polymerization

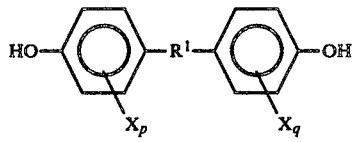 Formula (1):

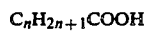 Formula (2):

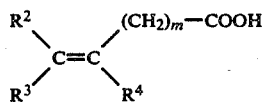 Formula (3):

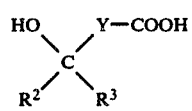 Formula (4):

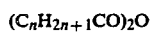 Formula (5):

wherein $R^1$ is a straight, branched or cyclic alkylidene group having 1 to 10 carbon atoms, an aryl-substituted alkylene group, an aryl group, —O—, —CO—, —S—, or —SO$_2$, X is halogen or a lower alkyl group, p and q are each an integer of 0 to 2, $R^2$, Rhu 3 and $R^4$ are each hydrogen or a lower alkyl group, Y is a bond or Y represents an alkylene group having 1 to 10 carbon atoms, m is an integer of 0 to 10, and n is an integer of 1 to 30.

2. A process as claimed in claim 1, wherein amount of the terminator of formulae (2), (3), (4) or (5) is 100 to 0.5 mole per 100 moles the dihydric phenol compound.

3. A process as claimed in claim 2, wherein the amount of the terminator of formulae (2), (3), (4) or (5) is 30 to 2 moles.

4. A process as claimed in claim 1, wherein the quaternary ammonium salt is added in an amount of 0.01 to 10 parts by weight per 100 parts by weight of the dihydric phenol compound.

5. A process as claimed in claim 4, wherein the amount of the quaternary ammonium salt is 0.1 to 3 parts by weight.

6. A process as claimed in claim 1, wherein the tertiary amine is added in an amount of 0.01 to 1.0 part by weight per parts by weight of the dihydric phenol compound.

7. A process as claimed in claim 6, wherein the amount of the tertiary amine is 0.05 to 0.2 part by weight.

8. A process as claimed in claim 1, wherein the emulsion polymerization is conducted for from 10 to 20 minutes.

* * * * *